United States Patent [19]

Gardner et al.

[11] 4,229,565
[45] Oct. 21, 1980

[54] PREPARATION OF POLYARYLATES FROM DIHYDRIC PHENOLS, AROMATIC DICARBOXYLIC ACID AND A CHLORINATING AGENT

[75] Inventors: Hugh C. Gardner, Somerville; Markus Matzner, Edison, both of N.J.

[73] Assignee: Union Carbide Corporation, New York, N.Y.

[21] Appl. No.: 37,991

[22] Filed: May 14, 1979

Related U.S. Application Data

[63] Continuation-in-part of Ser. No. 911,526, Jun. 1, 1978, abandoned.

[51] Int. Cl.² ............................................. C08G 63/18
[52] U.S. Cl. ................................. 528/176; 528/167; 528/169; 528/173; 528/179; 528/180; 528/190; 528/191; 528/194
[58] Field of Search ............... 528/167, 169, 173, 176, 528/180, 190, 191, 194, 179

[56] References Cited

U.S. PATENT DOCUMENTS

| | | | |
|---|---|---|---|
| 3,216,970 | 11/1965 | Conix | 528/176 |
| 3,351,624 | 11/1967 | Conix | 528/176 |
| 3,505,281 | 4/1970 | Hodge | 528/176 |
| 3,939,117 | 2/1976 | Ueno | 528/176 |

OTHER PUBLICATIONS

"Reagents for Organic Synthesis", L. F. Fieser et al., vol. 1, p. 1158, John Wiley and Sons Inc.

*Primary Examiner*—Lester L. Lee
*Attorney, Agent, or Firm*—Donald M. Papuga

[57] ABSTRACT

High molecular weight, thermally stable polyarylates are prepared directly from dihydric phenols, aromatic dibasic acids and a chlorinating agent without isolating an acyl halide intermediate. An organic phosphite can be added to reduce color formation.

13 Claims, No Drawings

PREPARATION OF POLYARYLATES FROM DIHYDRIC PHENOLS, AROMATIC DICARBOXYLIC ACID AND A CHLORINATING AGENT

This application is a continuation-in-part of copending patent application Ser. No. 911,526, filed June 1, 1978 and now abandoned.

BACKGROUND OF THE INVENTION

This invention pertains to the preparation of high molecular weight, thermally stable polyarylates.

Polyarylates, i.e., polymers consisting essentially of aromatic ester units, have previously been prepared from dihydric phenols, such as, Bisphenol-A, i.e. 2,2-bis(4-hydroxyphenyl) propane and terephthalic acid or a mixture of isophthalic and terephthalic acids by first converting the aromatic acids to their acyl chlorides, isolating and purifying them, and then subjecting them to a solution condensation polymerization or an interfacial condensation polymerization with the dihydric phenol. While polyarylates of satisfactory quality are obtained this way, the purification and isolation steps add to the cost of the final product thus limiting their commercial exploitation as extruded and shaped articles, textile fibers, films and the like.

U.S. Pat. No. 4,129,594, issued Dec. 12, 1978, describes the preparation of aromatic dicarboxylic acid chlorides which are used for the direct acylation of bisphenols to produce aromatic polyesters. This patent describes the preparation of terephthaloyl chloride by adding terephthalic acid to a dichloromethane medium containing phosgene and pyridine wherein the pyridine is present in an amount of about 1.1 equivalents per equivalent of carboxylic acid group in the total terephthalic acid employed. The dichloromethane is employed in an amount of from about 10 to 20 parts by weight per part of total terephthalic acid employed. The reaction is carried out at a temperature of about 15° to 30° C. to yield terephthaloyl chloride of at least 97 percent of theory. The terephthaloyl chloride is then reacted with Bisphenol-A to form oligomer products.

However, the preparation of terephthaloyl chloride as described in the aforementioned patent results in purification problems due to the required use of a base in excess of stoichiometry. Furthermore, the polyesters prepared in accordance with the procedures of U.S. Pat. No. 4,129,594, are low molecular weight polyesters.

It is therefore an object of this invention to provide a simple, economic process for the preparation of polyarylates without compromising molecular weight and/or mechanical/physical properties. In this process, the intermediate acid chloride is prepared with a catalytic amount of base.

Another object of this invention is to provide a process for the preparation of polyarylates using inexpensive reactants.

Still another object is to provide polyarylates having a minimum of color therein. Other objects will become apparent to those skilled in the art upon further reading of the specification.

SUMMARY OF THE INVENTION

It has now been discovered that high molecular weight, thermally stable polyarylates can be prepared from chlorinating agents, dicarboxylic acids and aromatic dihydroxy compounds without isolating and purifying the intermediate acid chloride. The reaction of the chlorinating agent with the dicarboxylic acid yields a product which surprisingly does not require purification prior to its reaction with the dihydroxy compound, yet yields polyarylates which are of high molecular weight and are thermally stable. This is unexpected since the prior art requires the use of purified diacid chlorides in order to achieve high molecular weights.

Generally, a 1:1 molar ratio of an acid chloride group to an aromatic hydroxy group is a prerequisite for high molecular weight products. However, this is a necessary but not sufficient condition to insure a desirable product. For example, a highly purified diacid cloride which was exposed to ambient humidity will undergo partial hydrolysis and be unsuitable for preparing useful polyesters, even when a 1:1 stoichiometry of acid chloride groups to aromatic hydroxy groups is utilized.

It has now been found that the following process steps yield a high molecular weight thermally stable polyarylate even through the apparent purity of the intermediate acid halide is in the range of about 90 to about 98 percent:

(a) mixing at least one aromatic dicarboxylic acid having 8 to about 20 carbon atoms with a stoichiometric excess of a chlorinating agent, (b) heating the mixture (a) at a temperature of about 25° to 180° C. until essentially all of the aromatic dicarboxylic acid groups are reacted, (c) removing unreacted chlorinating agent, (d) determining the amount of active chlorine groups in the resultant mixture, (e) adding an approximately stoichiometric amount of at least one dihydric phenol, based on the amount of active chlorine groups present, and (f) polymerizing the mixture from step (e) until a polyarylate having a reduced viscosity of at least 0.4 in p-chlorophenol at 49° C. at a concentration of 0.2 g/dl is obtained.

The dihydric phenol can be either a dihydric mononuclear phenol such as hydroquinone, resorcinol, or catechol or a dihydric polynuclear phenol and mixtures thereof. Examples of specific dihydric polynuclear phenols include, among others:

2,2-bis-(4-hydroxyphenyl)propane
2,2'-dihydroxydiphenylmethane,
bis-(2-hydroxyphenyl)methane,
bis-(4-hydroxyphenyl)methane,
bis-(4-hydroxy-2,6-dimethyl-3-methoxyphenyl)methane,
1,1-bis-(4-hydroxyphenyl)ethane,
1,2-bis-(4-hydroxyphenyl)ethane,
1,1-bis-(3-methyl-4-hydroxyphenyl)ethane,
2,2-bis-(4-hydroxy-3-bromophenyl)propane,
2,2-bis-(4-hydroxy-3-chlorophenyl)propane,
1,3-bis-(3-methyl-4-hydroxyphenyl) propane,
2,2-bis-(3-phenyl-4-hydroxyphenyl) propane,
2,2-bis-(3-isopropyl-4-hydroxyphenyl) propane,
2,2-bis-(2-isopropyl-4-hydroxyphenyl) propane
2,2-bis-(4-hydroxynaphthyl) propane,
2,2-bis-(4-hydroxyphenyl) pentane,
3,3-bis-(4-hydroxyphenyl) pentane,
2,2-bis-(4-hydroxyphenyl) heptane,
bis-(4-hydroxyphenyl) phenylmethane,
bis-(4 hydroxyphenyl) cyclohexylmethane,
1,2-bis-(4-hydroxyphenyl)-1,2-bis-(phenyl)-propane,
2,2-bis-(4-hydroxyphenyl)-1-phenyl-propane, and the like;

Di(hydroxyphenyl)sulfones such as
bis-(4-hydroxyphenyl)sulfone,
2,4'-dihydroxydiphenyl sulfone,
5'-chloro-2,4'-dihydroxydiphenyl sulfone,
5'-chloro-4,4'-dihydroxydiphenyl sulfone,
bis(4-hydroxy-3-chlorophenyl) sulfone, and the like;
Di(hydroxyphenyl) ethers such as
bis-(4-hydroxyphenyl)-ether,
the 4,5'-,4,2',2,2'-,2,3'-dihydroxydiphenyl ethers,
4,4'-dihydroxy-2,6-dimethyldiphenyl ether,
bis-(4-hydroxy-3-isobutylphenyl)-ether,
bis-(4-hydroxy-3-isopropylphenyl)-ether,
bis-(4-hydroxy-3-chlorophenyl)-ether,
bis-(4-hydroxy-3-fluorophenyl)-ether,
bis-(4-hydroxy-3-bromophenyl)-ether,
bis-(4-hydroxynaphthyl)-ether,
bis-(4-hydroxy-3-chloronaphthyl)-ether,
bis-(2-hydroxydiphenyl)-ether,
4,4'-dihydroxy-2,6-dimethoxydiphenyl ether,
4,4'-dihydroxy-2,5-diethoxydiphenyl ether,
4,4'-dihydroxy biphenyl and the like, and mixtures thereof.

Also suitable are the bisphenol reaction products of 4-vinyl-cyclohexene and phenols, e.g. 1,-3-bis(p-hydroxyphenyl)-1-ethylcyclohexane and the bisphenol reaction products of dispentene or its isomers and phenols such as 1,2-bis(p-hydroxyphenyl)-1-methyl-4-isopropylcyclohexane, as well as bisphenols such as 1,3,3-trimethyl-1-(4-hydroxyphenyl)-6-hydroxyindane, and 2,4-bis(4-hydroxyphenyl)-4-methylpentane, and the like.

Particularly desirable dihydric polynuclear phenols have the formula:

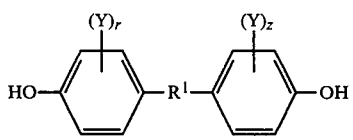

wherein Y is 1 to 4 carbon alkyl groups, or a halogen, r and z have values from 0 to 4, inclusive, and $R^1$ is a divalent saturated aliphatic hydrocarbon radical particularly alkylene and alkylidene radicals having from 1 to 3 carbon atoms, and cycloalkylene radicals having up to and including 9 carbon atoms.

Suitable aromatic dicarboxylic acids include terephthalic acid, isophthalic acid, naphthalene dicarboxylic acids and mixtures thereof as well as alkyl substituted homologs of these carboxylic acids wherein the alkyl groups contain from 1 to about 4 carbon atoms and acids containing other inert substituents such as halides, alkyl or aryl ethers, and the like.

A wide variety of chlorinating agents can be used herein. These chlorinating agents can be characterized into the following two groups. The first group includes thionyl chloride, phosgene, and phosphorus halides such as $PCl_5$, $PCl_3$, and $OPCl_3$. These chlorinating agents may be used in combination with a catalyst. The second group of chlorinating agents include chlorinated hydrocarbons such as carbon tetrachloride and α,α,α-,α',α',α'-hexachloroxylene used in conjunction with Lewis acid catalysts. This may be illustrated by the following equation, using carbon tetrachloride and an acid:

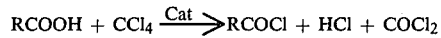

wherein the catalyst includes iron trichloride, aluminum trichloride and the like.

These chlorinating agents are prepared by methods well known in the art.

If desired, up to about 5 mole percent of a catalyst can be used for the preparation of acid chlorides wherein thionyl chloride, phosgene, or phosphorus containing chlorinating agents are reacted. The catalyst includes amides, having up to 10 carbon atoms, such as N,N-dimethyl formamide, N,N-dimethyl acetamide, N,N-diethyl formamide, N,N-diethyl acetamide, N-methyl-N-ethyl benzamide and the like, and heterocyclic N-containing compounds having up to 10 carbon atoms. A leading reference for this reaction is H. M. Bosshard et al., Helv. Chim. Acta, 42, 1653 (1959), which is incorporated herein by reference. Typical heterocyclic N-containing compounds include imidazole, benzimidazole, pyrazole, benzpyrazole, quinoline, pyridine, isoquinoline, and substituted derivatives thereof.

The conditions for the preparation of the crude acid chlorides depend upon the chlorinating agent. For example, about 6 hours at 90° C. are required to complete the chlorination when thionyl chloride is used.

Reaction time of about 10 hours (350 psi) at 175° C. is preferred for the carbon tetrachloride reaction. The most suitable conditions when other chlorinating agents are used are well known in the art; see, for example, U.S. Pat. No. 3,547,960 when phosgene is used.

Several methods are available to monitor the progress of the chlorination reaction. These methods include potentiometric titration of carboxyl and of active chlorine end-groups and spectroscopic techniques such as nuclear magnetic resonance, and the like.

The in-situ formation of the acid chloride is considered sufficient for polymerization purposes when less than about 0.5 percent of free carboxylic acid groups are present in the final mixture. Also, in the case of insoluble isophthalic and/or terephthalic acids, the final chlorinated product displays excellent solubility in methylene chloride; thus, the ability to obtain a clear methylene chloride solution is indicative that the reaction of the carboxylic acid groups is substantially complete.

The crude product obtained under the above conditions typically contains more than about 90 plus percent acid chloride groups based on theory.

This invention is applicable to the preparation of polyarylates in both low temperature and high temperature processes. In the low temperature technique, for example, polycondensation of the crude diacid chlorides with a dihydric phenol is effected at about 0° to 100° C. in an inert solvent, such as, methylene chloride, in the presence of a basic catalyst and an acid acceptor. The basic catalyst can be, for example, a tertiary amine, an ammonium compound, a phosphine compound, a phosphonium compound, and the like. The latter acid acceptors can be an alkaline-earth hydroxide or a tertiary amine.

The term alkaline-earth hydroxide is used to encompass barium, calcium, strontium, magnesium and beryllium hydroxides.

Exemplary tertiary amines include alkyl amines, such as trimethylamine, triethylamine, tripropylamine, tributylamine, and the like, where the alkyl group contains from 1 to about 10 carbon atoms; alkaryl amines, such as, N,N-dimethylaniline, N,N-diethylaniline, N,N-dimethylnaphthylamine, benzyl dimethylamine, alpha-methylbenzyl dimethylamine; pyridine, methyl-substituted pyridines, quinoline, and the like. Representative quaternary ammonium compounds include tetraethylammonium bromide, cetyltriethylammonium bromide, tetra-n-propylammonium hydroxide, tetra-n-butylammonium iodide, benzyltrimethylammonium chloride, and the like. Representative quaternary phosphonium compounds include n-butyl triphenylphosphonium bromide, methyltriphenylphosphonium bromide, and the like. Representative phosphines include triphenyl phosphine, dimethylphenyl phosphine, and the like. Catalyst concentrations between 0.001 and 5 mole percent based on the diydric phenol can be used.

Suitable inert organic solvents useful in this invention for low temperature polycondensation include, halogenated aliphatic compounds such as, methylene chloride, methylene bromide, 1,2-dichlorobenzene, monochlorobenzene, 1,2-dichloroethane, 1,1,2-trichloroethane, and the like, as well as cyclic ethers such as, tetrahydrofuran, dioxane, and the like.

The invention can also be practiced by an interfacial method which consists of stirring a solution of crude acid chloride in an inert organic solvent, such as methylene chloride, tetrahydrofuran, chlorobenzene and the like, within the presence of an aqueous solution of a dialkali metal salt of a dihydric phenol at a temperature of 0° to about 100° C., preferably 0° to 50° C. Suitable alkali metals are sodium, potassium, lithium, rubidium and the like. An emulsifying agent such as the tertiary amines given, supra, or their quaternary ammonium derivatives may also be used.

For high temperature polycondensations, suitable solvents include halogenated aromatic compounds, such as o-dichlorobenzene, 1,2,3-trichlorobenzene, 1,2,4-trichlorobenzene, diphenyl ether, anisole, diphenyl sulfone, benzoic acid esters and mixtures thereof. The preferred temperature is between about 180° and 250° C. and reaction time is about 4–10 hours. The concentration of polymer is between about 5 and 30 weight percent.

It is preferred, in order to insure polymers with better color, to incorporate in the claimed process about 0.05 to about 6 percent by weight, based on the weight of chlorinating agent, of a trivalent phosphorous compound having the formula $(Q)_3P$ wherein Q is R or —OR and R is aryl having 6 to 18 carbons, optionally substituted with halogen or alkyl groups containing 1–4 carbon atoms. A preferred class of trivalent phosphorous compounds are the organic phosphites having the formula $(RO)_3P$. If used, the trivalent phosphorus compound should be added before chlorination of the aromatic dicarboxylic acid.

It was unexpected that the presence of the organophosphite compounds does not affect the subsequent polymerization since high purity monomers are generally required to obtain acceptable polymers. Moreover, the thermal stability of the polyarylates obtained is astonishingly not affected by these phosphorous-containing residues.

As used herein, the terms "high molecular weight" and "thermal stability" are defined as follows: High molecular weight polyarylates possess reduced viscosities of about 0.4 or greater when measured in p-chlorophenol solvent at 49° C. at a concentration of 0.2 g./dl. Thermal stability is determined using an extrusion plastometer. This apparatus is described in ASTM D1238. In this test, the flow rates of molten polymer maintained at a temperature suitable for molding or extrusion (for example, 350° C.) are measured after specific time periods. Samples are obtained after a 10 minute preheat and after a 30 minute preheat. The ratio of flow rates ($MF_{30\ min.}/MF_{10\ min.}$) is the criterion for thermal stability. If the ratio is between about 0.6 and 2.0, the stability is acceptable, since material with this range of values can be successfully utilized in commercial fabrication operations. The preferred range of ratios is 0.8 to 1.4.

Preferred organic phosphites are aryl phosphites such as, triphenyl phosphite, tris(p-isopropylphenyl) phosphite and the like.

Suitably substituted phosphonites and phosphinites may also be employed, such as di-p-chlorophenyl phenyl phosphonite, p-chlorophenyl diphenyl phosphinite and the like.

Pressure is not narrowly critical and while atmospheric ambient conditions are preferred for economic reasons, if one desires, superatmospheric as well as subatmospheric pressures can also be used.

The invention is further described in the examples which follow. All parts and percentages are by weight unless otherwise specified.

EXAMPLE 1

PREPARATION OF A POLYARYLATE FROM CRUDE ACID CHLORIDE

A 4-necked 500 ml round bottom flask fitted with a paddle stirrer, ice water condenser, nitrogen inlet tube, thermometer and an addition funnel was charged with 86.3 ml of commercial yellow thionyl chloride. The liquid was rapidly stirred as 4.0 ml of triphenyl phosphite was added. The solution became almost colorless immediately. Then 62.3 g. (0.375 moles) of isophthalic acid, 20.76 g (0.125 moles) of terephthalic acid and 0.385 ml of N,N-dimethyl formamide were added. The mixture was stirred and immersed in an oil bath at 90°±10° C. The mixture was heated for 65 minutes. Then 1.0 ml of triphenyl phosphite was added. The mixture was heated for an additional 5 hours. The excess thionyl chloride was removed under vacuum. The pale yellow liquid remaining weighed 106.2 g. A portion of this material was titrated for active chlorine from which the purity of the isophthaloyl/terephthaloyl chloride thus produced was deduced as being of about 93 percent.

The crude acid chloride mixtures were analyzed by one of two methods as follows:

(1) The weight percent of active chlorine was determined by treating the sample with an excess of m-chloroaniline in dry acetone. The formed anilinium salt was then titrated potentiometrically with a standardized aqueous sodium hydroxide solution. This method is outlined by S. Siggia in "quantitative Organic Analysis via Functional Groups" John Wiley & Sons, New York (1966). The active chlorine content of pure iso/terephthaloyl chlorides is 34.93 weight percent. The "purity of the crude acid chloride mixture" was defined by $100 \times (X/34.93)$ where X=wt.% active chlorine in the crude mixture. In some cases, solutions of the crude mixtures (in methylene chloride or 1,2,4-trichlorobenzene) were also analyzed potentiometrically. Handling the crude products in this manner reduced the chances of hydrolysis of the unstable acid chlorides by moisture in the air.

(2) The conversion of iso/terephthalic acids to soluble acid chloride-containing species was also monitored by proton nuclear magnetic resonance spectroscopy. Monochlorobenzene was added as an internal standard at the beginning of the reaction. A sample of the acid/acid chloride/thionyl chloride/monochlorobenzene reaction mixture was removed at the end of the reaction. By comparing the areas of the resonances assigned to the acid chloride containing species with that of the internal standard, the percent conversion in the mixture was determined. Then the volatile components (thionyl chloride, chlorobenzene, etc.) were removed in vacuo. The residue was the crude acid chloride mixture. In this case the "purity of the crude acid chloride mixture" was taken as the percent conversion observed in the nmr analysis of the final reaction mixture.

A 20.3 g. portion of the acid chloride mixture prepared above was charged to a 4-necked, 500 ml flask fitted with a paddle stirrer, nitrogen inlet tube and an ice/water condenser. To the flask was also added 19.4 g of Bisphenol-A (0.170 moles of aromatic OH groups), 17.8 g (0.24 moles) of calcium hydroxide, 200 ml of methylene chloride and 100 microliters of triethylamine. The mixture was stirred for 3 hours during which time an additional 1.36 g of Bisphenol-A was added in 3 portions. The polymer was then terminated with 0.34 g of p-phenylphenol. The mixture was diluted with 600 ml of methylene chloride and filtered. The polymer solution obtained was essentially colorless. The polyarylate was isolated from the filtrate by coagulation in excess methanol. The reduced viscosity of the polyarylate was 0.74 (determined at 49° C. in p-chlorophenol at a concentration of 0.2 g/dl). The polyarylate had excellent thermal stability at 350° C. ($MF_{30\ min.}/MF_{10\ min.} = 1.05$) in an extrusion plastometer, supra.

EXAMPLE 2

FURTHER PREPARATION OF POLYARYLATES

A 1 liter, 3-necked round bottom flask fitted with a paddle stirrer, nitrogen inlet tube, thermometer and an ice/water condenser leading to a caustic scrubber was charged with 172.6 ml (2.4 moles) of commercial yellow thionyl chloride. The thionyl chloride was Hooker PL6-2223. The thionyl chloride was rapidly stirred while 7.0 ml (0.027 moles) of triphenyl phosphite was added dropwise. The solution immediately became alsmost colorless. Then 124.6 g (0.75 moles) of isophthalic acid and 41.53 g (0.25 moles) of terephthalic acid, and 0.80 ml (0.01 moles) of N,N-dimethyl formamide were added. The mixture was heated with stirring in an oil bath maintained at 87°-102° C. for 6.8 hours. The excess thionyl chloride was removed under vacuum, leaving a pale yellow liquid which amounted to 207 g. This material, containing a mixture of isophthaloyl and terephthaloyl chlorides, was analyzed potentiometrically. It contained 32.6 percent by weight of active chlorine.

A 4-necked, 500 ml round bottom flask fitted with a paddle stirrer, nitrogen inlet tube, an ice/water condenser, and a thermometer was charged with 400 ml of methylene chloride and 40.6 grams of the acid chloride mixture prepared in the previous paragraph. Based on the active chlorine analysis, the actual number of moles of acid chloride groups was 0.374. To the solution thus obtained was added 43.2 g of Bisphenol-A (0.378 moles of aromatic OH groups) and 35.6 g (0.480 moles) of calcium hydroxide. The mixture was stirred in a water bath at 20° C. and 100 microliters of triethylamine added. The mixture was stirred for 3 hours and then p-phenyl phenol, 0.68 g (4.0 millimoles) was added to terminate the polymerization. The mixture was diluted with 2 liters of a 1:1 (volume) solution of chloroform and methylene chloride and was filtered through a Celite bed (Celite is a trade mark of Johns-Mansville Company for a filtering aid). The filtrate thus obtained was essentially colorless. It was divided into 3 portions. The sample giving the lowest color melt extrudate was obtained by washing the polymer solution with an equal volume of 1% hydrochloric acid and then 3 times with distilled water until the pH of the solution was 5-6. The polyarylate thus obtained was recovered by coagulation in methanol and the resultant fluff washed twice in methanol. This polymer had a reduced viscosity of 1.08 when measured in p-chlorophenol at 49° C. at a concentration of 0.2 g/dl.

EXAMPLE 3

PREPARATION OF POLYARYLATES IN THE ABSENCE OF COLOR INHIBITORS

A 3 liter flask fitted with a paddle stirrer, thermometer, a nitrogen inlet, and two ice/water condensers leading to a large flask containing 10 percent aqueous sodium hydroxide was charged with 373.8 g. of isophthalic acid, 124.6 g. of terephthalic acid, 4.62 ml of N,N-dimethyl formamide and 795 ml of commercial grade yellow thionyl chloride. The temperature of the mixture was raised to 93° C. over a 5 hour period. The yellow product was heated under vacuum to remove excess thionyl chloride. The residue weighed 605 g. A 25.0 g. portion of the residue was dissolved in 80.1 g. of anhydrous methylene chloride. This mixture was analyzed for active chlorine via the potentiometric method described in example 1. Tthe active chlorine content of the solution was 7.64 weight percent, indicating that purity of the crude acid chloride was 92 weight percent. (A solution of a pure sample of acid chloride should contain 8.31 weight percent active chlorine).

A 12 liter Morton flask fitted with a paddle stirrer, nitrogen inlet, an ice/water condenser and an addition funnel was charged with 380.0 g (5.13 moles) of calcium hydroxide, 487.3 g of Bisphenol-A (4.270 moles of aromatic OH groups), 4.36 g (0.026 moles) of p-phenyl phenol, 1.5 ml of triethtylamine, and 3.2 liters of methylene chloride. The mixture was stirred and cooled in an ice/water bath while 1981 g of the crude acid chloride/methylene chloride solution (7.64 weight percent active chlorine) was added slowly over a 2 hour period. [This amount of acid chloride afforded a 1:1 aromatic OH:acid chloride group stoichiometry]. The viscous reaction mixture was stirred for an additional half hour and then treated with 5.0 g of p-phenyl phenol and 4 liters of methylene chloride. The polymerization mixture was further diluted with 20 liters of methylene chloride and filtered through a bed of Celite filter aid. A 500 ml portion of the filrate was washed with an equal volume of distilled water containing 3 ml of phosphoric acid. The resulting organic layer was washed three additional times with distilled water and then coagulated in methanol. The fibrous polymer obtained was washed twice with methanol in a Waring Blendor and then dried. The reduced viscosity of the polymer was 1.03 (p-chlorophenol, 49° C., 0.2 g./dl.).

EXAMPLES 4–12

ONE-POT POLYARYLATES MADE FROM CRUDE ACID CHLORIDES BY THE CALCIUM HYDROXIDE PROCESS

Using the polymerization procedure described in Examples 1-3, a series of polyarylates was made in which the stoichiometry of acid chloride groups to aromatic OH groups was varied. Table 1 below shows comparative data together with the reduced viscosities of the polyarylates obtained. The melt stability properties of some of these polyarylates are presented in Table 2.

trap, a thermometer, and a heating mantle was charged with 15.23 g of the crude acid chlorides prepared in Example 1, 16.20 g of Bisphenol-A (0.1419 moles of aromatic OH groups) and 250 ml of 1,2,4-trichlorobenzene. Based on the active chlorine content analysis, the acid chloride group content of the charge was therefore 0.1404 moles. The mixture was heated to reflux (215° C.) and maintained at the temperature for 18 hours. The resulting light yellow polymer solution was poured into 500 ml of toluene and allowed to cool to room temperature. The mixture was coagulated in methanol. The polymer thus obtained was washed twice with methanol, dried overnight at 70° C. in a forced-air oven and for 2 days in a vacuum oven at 120° C./(0.5 mm). The reduced viscosity of the dried polyarylate was 1.07

TABLE 1

| Example No. | Method of analysis of Crude Acid Chloride Mixture[a] | Active Chlorine Content of Solid (wt. %) | Purity of Acid Chlorides (wt. %) | Acid Chloride Groups (mmol)[b] | Actual Acid Chloride Groups (mmol)[d] | Bisphenol A (mmol) | Acid Chloride Group/Aromatic OH Group Stoichiometry[d] | P-Phenyl Phenol (mmol) | RV[c] (Time of Reaction) |
|---|---|---|---|---|---|---|---|---|---|
| 4 | A | | 97 | 180 | 174 | 85 | 1.023 | | 0.82(2.2hr) |
| 5 | C | | 92 | 223.8 | 206 | 100 | 1.030 | 1.0 | 0.66(2.6hr) |
| 6 | C | | 92 | 134 | 113.2 | 60 | 1.025 | 0.6 | 0.57(2.2hr) |
| 7 | C | | 92 | 130 | 120 | 60 | 1.000 | 1.0 | 1.01(2hr) |
| 8 | C | | 94 | 212.8 | 199.8 | 100 | 0.999 | | 0.44(1.2hr) |
| 9 | C | | 94.0 | 212.6 | 200 | 103.0 | 0.970 | 0.6 | 0.70(5.4hr) |
| Control A[e] | B | 32.6 | 93.3 | 200 | 186.6 | 85.0 | 1.094 | | 0.30(1hr) |
| 10 | *B | 32.6 | 93.3 | 200 | 186.6 | 91 | 1.025 | | 0.71(1.5hr) |
| 11 | *B | 32.6 | | 400 | 373.6 | 189.2 | 0.988 | | 1.08(4.0hr) |
| 12 | *B | 32.9 | 94.0 | 200 | 188 | 92 | 1.021 | 0.75 | 0.59(6.0hr) |

[a] A = analyzed by nuclear magnetic resonance.
 B = potentiometric titration of solid acid chloride dissolved in acetone.
 C = potentiometric titration of solutions of crude acid chloride.
[b] From weight of sample assuming 100% purity.
[c] In p-chlorophenol at 49° C. (0.2 g./dl)
[d] Based on analytical data.
[e] This shows the effect of inappropriate acid chloride/aromatic OH group stoichiometry on molecular weight.
*2.7 mol % of triphenyl phosphite added to the initial thionyl chloride (based on the moles of iso- and terephthalic acid).

TABLE 2

MELT STABILITY PROPERTIES OF POLYARYLATES

| Example No. | Temp. (°C.) | RV[a] Polymer | MF1[b] | MF2[c] | MF2/MF1 | Washes[d] |
|---|---|---|---|---|---|---|
| 3 | 350 | 1.03 | 1.34 | 1.50 | 1.12 | H3PO4 |
| 4 | 350 | 0.82 | 3.25 | 3.62 | 1.11 | HCl |
| 9 | 350 | 0.70 | 4.69 | 4.68 | 1.00 | None |
| 10 | 350 | 0.67 | 3.33 | 4.14 | 1.24 | None |
| 11 | 375 | 1.08 | 1.48 | 1.60 | 1.08 | Water only |
| 12 | 350 | 0.59 | 4.60 | 3.67 | 0.80 | NaOH Followed by HCl |
| 13[e] | 375 | 1.07 | 2.31 | 2.51 | 1.09 | None |

[a] In p-chlorophenol at 49° C. (0.2 g./dl.)
[b] 10 minute preheat, 1P weight (dg./min.) (same as MF10 min.).
[c] 30 minute preheat, 1P weight (dg./min.) (same as MF30 min.).
[d] The filtered polymer solution was washed with a dilute solution of the indicated acid. Three successive washings with distilled water followed. Average time of each wash was about 25 minutes of vigorous stirring in a Morton flask.
[e] Polymer made via the high temperature trichlorobenzene process.

EXAMPLES 13–15

POLYARYLATES MADE BY THE TRICHLOROBENZENE PROCESS

A 500 ml 3-necked flask fitted with a paddle stirrer, nitrogen inlet, an Allihn condenser leading to a caustic when measured in p-chlorophenol at 49° C. at a concentration of 0.2 g/dl. Experimental details are presented in Table 3 together with comparable data from 2 additional runs. Melt stability results for Example 13 are given in Table 2.

TABLE 3

POLYARYLATES MADE VIA THE TRICHLOROBENZENE PROCESS

| Example No. | Method of analysis of Acid chloride Mixture[a] | Active Chlorine Content (wt. %) | Purity of Acid Chlorides (wt. %) | Acid chloride Group[b] (Millimoles) | Actual Acid Chloride Groups (Millimoles) | Bisphenol-A (Millimoles) | Trichlorobenzene (ml.) | RV[c] |
|---|---|---|---|---|---|---|---|---|
| 13 | B | 32.6 | 93.4 | 150.2 | 140.4 | 70.9 | 250 | 1.07 |
| 14 | C | | 95.0 | 161.0 | 171.0 | 80.5 | 210 | 1.23 |

TABLE 3-continued
POLYARYLATES MADE VIA THE TRICHLOROBENZENE PROCESS

| Example No. | Method of analysis of Acid chloride Mixture[a] | Active Chlorine Content (wt. %) | Purity of Acid Chlorides (wt. %) | Acid chloride Group[b] (Millimoles) | Actual Acid Chloride Groups (Millimoles) | Bisphenol-A (Millimoles) | Trichloro-benzene (ml.) | RV[c] |
|---|---|---|---|---|---|---|---|---|
| 15[d] | B | 32.9 | 94.1 | 180.0 | 141.8 | 70.9 | 200 | 0.70 |

[a]B = potentiometric titration of solid acid chloride dissolved in acetone.
C = potentiometric titration of solutions of crude acid chloride.
[b]From weight of sample assuming 100% purity.
[c]Reduced viscosity in p-chlorophenol at 49° C. at concentration of 0.2g./dl.
[d]0.5 millimole of p-phenyl phenol added to initial reaction mixture. Polymerization carried out in the presence of 2.5 g. of DARCO G-60 activated carbon.

EXAMPLE 16

Using the procedure outlined in Example 13, a high molecular weight polyarylate is obtained by heating 15.23 g of the crude acid chloride mixture (prepared in Example 1) and 15.48 g of bis(4-hydroxyphenyl) thioether in 250 ml. of 1,2,4-trichlorobenzene. This polymer has comparable melt stability properties.

EXAMPLE 17

A polyarylate is prepared as in Example 16 except that the initial charge of acids used to make the crude acid chloride mixture is a 60%/40% terephthalic acid/isophthalic acid mixture. This polymer has excellent toughness and stress-crack resistance towards organic solvents.

EXAMPLE 18

A mixture of crude acid chlorides containing 60%/40% of isophthalic/terephthalic residues is obtained using α,α, α,α',α',α'-hexachloroxylene as the chlorinating agent. Interfacial polymerization in a methylene chloride/water solvent system with a 3:1 molar mixture of the disodium salts of Bisphenol-A/hydroquinone yields a high molecular weight polymer.

EXAMPLE 19

Crude 1,6-naphthalene dicarboxylic acid chloride is prepared using the phosgenation method described in U.S. Pat. No. 3,547,960. Polymerization with Bisphenol-A in tetrahydrofuran solvent using triethylamine as the acid acceptor yields a high molecular weight polyarylate.

What is claimed is:

1. A method for preparing polyarylates which comprises:
   (a) mixing at least one aromatic dicarboxylic acid having 8 to about 20 carbon atoms with a stoichiometric excess of a chlorinating agent,
   (b) heating the mixture from (a) at a temperature of about 25° to about 180° C., until essentially all of the dicarboxylic acid groups are reacted,
   (c) removing unreacted chlorinating agent,
   (d) determining the amount of active chlorine in the resultant mixture,
   (e) adding an approximately stoichiometric amount of at least one dihydric phenol, based on the amount of active chlorine present, and
   (f) polymerizing the mixture from step (e) until a polyarylate having a reduced viscosity of at least 0.4 in p-chlorophenol at 49° C. at a concentration of 0.2 g/dl. forms.

2. A method claimed as in claim 1 wherein the aromatic dicarboxylic acid is terephthalic acid, isophthalic acid or a mixture thereof.

3. A method claimed as in claim 1 wherein the aromatic dicarboxylic acid is a naphthalene dicarboxylic acid.

4. A method claimed as in claim 1 wherein the dihydric phenol is 2,2-bis(4-hydroxyphenyl) propane.

5. A method claimed as in claim 1 wherein the dihydric phenol is hydroquinone.

6. A method claimed as in claim 1 wherein the dihydric phenol is a biphenol.

7. A method claimed as in claim 1 wherein the chlorinating agent is selected from the group consisting of thionyl chloride, phosgene, phosphorous halides and chlorinated hydrocarbons.

8. A method claimed as in claim 1 wherein the polymerization is carried out in an inert organic solvent in the presence of a basic catalyst and an acid acceptor at a temperature of about 0° to 100° C.

9. A method as in claim 1 wherein the polymerization is carried out by an interfacial process.

10. A method as in claim 9 wherein the crude acid chloride in an inert organic solvent is stirred with an aqueous solution of a dialkali metal salt of a dihydric phenol in the presence of an emulsifying agent.

11. A method claimed as in claim 1 wherein the polymerization is carried out in an inert organic solvent at a temperature of about 150° to about 250° C.

12. A method claimed as in claim 1 wherein the chlorinating agent used contains about 0.05 to about 6 percent by weight of a trivalent phosphorous compound having the formula $(Q)_3P$ wherein Q is R or —OR and R is aryl having 6 to 18 carbons, optionally substituted with halogen or alkyl groups having 1 to about 4 carbons.

13. A method as claimed in claim 12 wherein the trivalent phosphorous compound is triphenyl phosphite.

* * * * *